US008470064B2

(12) United States Patent
Davis et al.

(10) Patent No.: US 8,470,064 B2
(45) Date of Patent: Jun. 25, 2013

(54) DEVICE, METHOD, AND SYSTEM TO SEPARATE LIQUID AND PARTICULATE MATTER FROM THE AIR STREAM OF A CENTRIFUGAL FAN

(75) Inventors: Joseph Byron Davis, Richmond, TX (US); Gary Thelen Leseman, Houston, TX (US)

(73) Assignee: Leseman Davis, LLC, Houston, TX (US)

( * ) Notice: Subject to any disclaimer, the term of this patent is extended or adjusted under 35 U.S.C. 154(b) by 195 days.

(21) Appl. No.: 13/075,794

(22) Filed: Mar. 30, 2011

(65) Prior Publication Data

US 2011/0247308 A1 Oct. 13, 2011

Related U.S. Application Data

(60) Provisional application No. 61/342,247, filed on Apr. 12, 2010.

(51) Int. Cl.
*B01D 19/00* (2006.01)

(52) U.S. Cl.
USPC .................. 55/471; 55/392; 55/393; 55/394; 55/395; 55/396; 55/397; 55/398; 55/399; 55/423; 55/467; 55/470; 55/472; 55/473; 55/428; 55/429; 55/430; 55/432; 55/433

(58) Field of Classification Search
USPC .................. 55/392–399, 423, 467, 470–473, 55/428, 429–433
See application file for complete search history.

(56) References Cited

U.S. PATENT DOCUMENTS

| | | | |
|---|---|---|---|
| 3,796,511 | A | 3/1974 | Hansen |
| 3,953,183 | A | 4/1976 | Regehr |
| 4,198,215 | A | 4/1980 | Regehr |
| 4,348,057 | A | 9/1982 | Parenti et al. |
| 4,581,051 | A | 4/1986 | Regehr et al. |
| 4,588,351 | A | 5/1986 | Miller |
| 5,000,769 | A | 3/1991 | Raguideau et al. |
| 5,207,557 | A | 5/1993 | Smiley et al. |
| 5,772,399 | A | 6/1998 | Mehta et al. |
| 6,267,016 | B1 | 7/2001 | Michell et al. |
| 6,435,043 | B1 | 8/2002 | Ferguson et al. |

(Continued)

OTHER PUBLICATIONS

International Search Report and Written Opinion, dated Dec. 14, 2011, in PCT/US2011/031227, filed Apr. 5, 2011, which claims priority of the instant application.

(Continued)

*Primary Examiner* — Jason M Greene
*Assistant Examiner* — Dung H Bui
(74) *Attorney, Agent, or Firm* — Sutton McAughan Deaver, PLLC

(57) ABSTRACT

A system for separating contaminants from an airstream, including a centrifugal fan and housing; a contaminant containment vessel mounted to an outer surface of the housing; and a diverter in the airstream downstream of the fan and within the housing, the diverter being configured to separate a portion of the airstream from a remainder of the airstream, accelerate the portion of the airstream towards the containment vessel, and thereafter guide the portion of the airstream towards the remainder of the airstream. The diverter preferably does not negatively impact the rated performance of the fan, such that a performance of the system is not measurably different than the rated performance of the fan and housing combination. The diverter may accelerate contaminants entrained in the airstream toward the containment vessel, thereby separating the contaminants from the airstream.

20 Claims, 2 Drawing Sheets

U.S. PATENT DOCUMENTS

| | | |
|---|---|---|
| 6,648,935 B2 | 11/2003 | Petersen, Jr. et al. |
| 7,771,501 B2 | 8/2010 | Wang |
| 2004/0126141 A1 | 7/2004 | Michell et al. |
| 2008/0016830 A1* | 1/2008 | Witter .............................. 55/337 |

OTHER PUBLICATIONS

Chang, B., The international Search Report, dated Dec. 14, 2011, The International Bureau of WIPO, Switzerland.

* cited by examiner

DEVICE, METHOD, AND SYSTEM TO SEPARATE LIQUID AND PARTICULATE MATTER FROM THE AIR STREAM OF A CENTRIFUGAL FAN

CROSS REFERENCE TO RELATED APPLICATIONS

This application is a non-provisional of, and claims priority benefit of U.S. Application Ser. No. 61/342,247, filed Apr. 12, 2010, entitled "DEVICE TO SEPARATE LIQUID AND PARTICULATE FROM THE AIR STREAM IN A CENTRIFUGAL FAN", which is incorporated herein by specific reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to centrifugal fans; and more specifically relate to centrifugal fans used in cooling and other applications where entrained water and/or dust may be undesirable.

2. Description of the Related Art

U.S. Pat. No. 3,796,511 discloses a "blower is comprised of a substantially cylindrical housing having end walls and an arcuate wall forming a substantially cylindrical chamber. A discharge opening is formed in the arctuate wall and an intake opening is formed in at least one of the end walls. A cylindrical fan rotor is rotatably mounted within the chamber for drawing air into the chamber through the intake opening and for propelling it around the interior of the chamber and outwardly through the discharge opening. There is a slot in the arcuate wall adjacent the discharge opening, and a skinning member protrudes radially inwardly adjacent the slot for directing a thin layer of air adjacent the arcuate wall of the chamber outwardly through the slot so as to remove dust particles adjacent the outer peripheral edge of the housing wall."

U.S. Pat. No. 3,953,183 discloses "apparatus for separating particles from a gas flow is provided, comprising: is provided on the concave side of each crest, the serrations winning A plurality of corrugated separator plates arranged in spaced parallel relation to each other and defining wave-like flow channels between each other. The warped surfaces of the separator plates are generated in cross-section by at least three circular arcs connected continuously and with alternating directions of curvature. The radius of each of the three circular arcs is different, the radius of the arc representing the crest being the smallest. The arcs define at least one crest between two troughs, forming an intake section and an outlet-section, respectively of each separator plate. A first separating chamber is provided opening towards the gas flow on the convex side of the crest and is formed by a blade projecting from the downstream side of the crest toward its upstream side and running along the crest. A plurality of serrations running along underneath the crests arranged opposite to the separating chambers of the crest of the adjacent separator plate. The smaller radius of the second arc and the serrations together with the separating chamber provide a narrowing of the duct toward the crest to increase the speed of the fluid flow. A collision occurs between the main upstream gas flow and a continuous gas flow recoil from the first separating chamber, causing a stationary micro-turbulence in the vicinity of the serrations without a significant loss of energy and speed, whereby even the smallest particles are separated by the serrations. Two additional separating chambers of specific cross-sections are provided strategically on the downstream past the crest, each retaining material particles not caught previously."

U.S. Pat. No. 4,348,057 discloses "a blower having an exhaust fan which draws air through its intake opening from the face of the coal. The blower is provided with a first stage of closely-arranged small-diametered cylindrical-shaped individual centrifuges between its intake opening and the exhaust fan in which the dust-laden air spins as air is drawn therethrough and concentrates the dust in an annular surrounding portion which is separately drawn from the centrifuges through a conduit also evacuated by the exhaust fan. This conduit contains a sharply-reversing bend which effectively separates and discharges the dust into a collection chamber, e.g. a removable bin. A grid disposed ahead of the first stage of individual centrifuges prevents large size particles from entering the centrifuges; and a second stage of closely-arranged, similarly-operating individual centrifuges located in the conduit closer to the exhaust fan remove "fines" which were not discharged to the collection chamber. The thus cleaned air exiting from the conduit is combined by the fan with the dust-freed air drawn from the core of the individual centrifuges and is discharged to the mine return area."

U.S. Pat. No. 4,581,051 discloses "an apparatus for the separation of liquid drops or particulate solids from a gas stream comprising a plurality of parallel separator plates, a flow passage being formed between every two separator plates, each separator plate having at least one wave crest disposed approximately in its center and two wave troughs disposed at its edge on the inlet side and the outlet side, respectively, and forming an inlet section and an outlet section, respectively, as well as impingement-wall sections formed between the wave crest and the wave troughs, a main phase-separator chamber open in a direction counter to the direction of the gas flow being formed externally on the wave crest. In accordance with the invention, high separation efficiency with low pressure drop or low energy loss is obtained by providing an inlet nozzle formed in the inlet section, the gas stream being directable by means of the inlet nozzle onto the region on the inlet side of the opposite impingement-wall section."

U.S. Pat. No. 4,588,351 discloses a "centrifugal-type air blower for a vehicle occupant compartment that operates in a housing and during a defrost mode to deliver heated air to defrost the vehicle's windshield is provided with an automatic bleed-off valve arrangement that automatically exhausts from the blower housing to outside the vehicle any airborne particles such as snow and water centrifugally discharged by the blower in the defrost mode when the outside air temperature falls below a predetermined sub-freezing water temperature."

U.S. Pat. No. 5,000,769 discloses a "system for ventilating a rail traction motor and for dynamically purifying the ventilation air, the system comprising a centrifugal fan (1) having radial blades (2) surrounded by a circular housing (3) and delivering air to the motor, and dynamic filter means on the path of the air delivered by the fan. The system includes a plane sheet (4) pierced by peripheral through openings (5) forming a diffusing screen and dividing the inside volume of the circular housing into an upstream chamber (6) connected to the air inlet of the fan, and a downstream chamber (7) connected to its outlet leading to the motor, an exhaust outlet (8) for exhausting impure air, the exhaust outlet being in the form of a sector on the periphery of the upstream chamber, and a separator element (9) disposed facing the opening and forming an obstacle to deflect air streams close to the blades of the fan towards a take-up section close to the exhaust opening."

U.S. Pat. No. 6,648,935 discloses a "two stage extracting blower that cleans liquid and solid contaminants from supply air, and provides high velocity air for cooling equipment, personnel and/or structures. In a first air cleaning stage, the blower uses air velocity and the centrifugal force of a rotating impeller to separate heavier contaminants entrained in a dirty air stream into a rear partitioned chamber of the blower housing. In a second air cleaning stage, the blower uses centrifugal forces imparted by the impeller on lighter contaminants to cause the contaminants to be collected in a skimmer provided in the partially cleansed air stream prior to release of the air stream from the blower."

U.S. Pat. No. 7,771,501 discloses a "blower having oil-mist blower is disclosed. The blower is provided with tubing fitting on the wind suction opening connecting in series to an oil-collection box module. The position of the venting tube of the blower is connected to cyclone-separator. The oil-collection box module includes a box body, oil-collection seat body, filter and a cover plate. The cyclone-separator includes manifold tubing, filtering aid and a top cover. When the blower is in operation, the oil-collection box module sucks in oil-mist exhaust gas to proceed with first filtering of oil spot after that via the venting tubing into the cyclone-separator to proceed with a second filtering of oil spot."

The inventions disclosed and taught herein are directed to an improved device, method, and system to separate liquid and particulate matter from an air stream of a centrifugal fan.

BRIEF SUMMARY OF THE INVENTION

The present inventions include a system for separating contaminants from an airstream, the system comprising: a centrifugal fan housing; a centrifugal fan disposed within the housing and configured to provide an airstream within the housing; a contaminant containment vessel mounted to an outer surface of the housing; and a diverter in the airstream downstream of the fan and within the housing, the diverter being configured to separate a portion of the airstream from a remainder of the airstream, accelerate the portion of the airstream towards the containment vessel, and thereafter guide the portion of the airstream towards the remainder of the airstream. The diverter may be configured so as to prevent any negative impact the rated performance of the fan and housing combination, such that a performance of the system is not measurably different than the rated performance of the fan and housing combination. The diverter may accelerate contaminants entrained in the airstream toward the containment vessel, thereby separating the contaminants from the airstream. The containment vessel and diverter may be integrated as a removable housing adapter bolted to the housing. Alternatively, the housing adapter may be welded to the housing. The system may further include a valve downstream of the diverter and containment vessel to selectively allow the airstream to force, and selectively prevent the airstream from forcing, contaminants entrained in the airstream through and out of the containment vessel. The diverter may create a low pressure area within the containment vessel. More specifically, the diverter may accelerate and reduce a pressure of the portion of the airstream compared to the remainder of the airstream. For example, the diverter may be a complex curved airfoil and/or a plate mounted within and across the housing that is configured to first divert the portion of the airstream out of the housing and then guide the portion of the airstream back into the housing.

The present inventions also include a device for separating contaminants from an airstream, the system comprising: two parallel flanges configured to be secured outside of a centrifugal fan housing; an outer flange connecting the two parallel flanges; a contaminant containment vessel mounted to the outer flange; and a diverter spanning the parallel flanges, such that the diverter is configured to separate a portion of an airstream flowing between the parallel flanges from a remainder of the airstream, accelerate the portion of the airstream towards the containment vessel, and thereafter guide the portion of the airstream towards the remainder of the airstream. The device may be similar to the housing adapter, and/or components of the housing adapter, discussed above.

The present inventions also include a method of separating contaminants from an air stream, the method comprising the steps of: providing a standardized centrifugal fan housing, the housing having two sides and an outer wall connecting the sides; providing a centrifugal fan disposed within the housing such that the fan is operable to provide an airstream at a rated performance when disposed within the housing absent downstream restrictions; cutting a hole in the housing, the hole spanning the outer wall and through both sides; mounting a housing adapter to the housing, the adapter including—a contaminant containment vessel exterior to the housing; and a diverter spanning the sides, such that the diverter is configured to separate a portion of the airstream flowing between the sides from a remainder of the airstream, accelerate the portion of the airstream towards the containment vessel, and thereafter guide the portion of the airstream towards the remainder of the airstream. In preferred embodiments, mounting the diverter does not negatively impact the rated performance of the fan within the housing, such that a performance of the airstream downstream of the diverter is not measurably different than the rated performance of the fan within the housing. The method may include opening a valve downstream of the containment vessel to selectively allow the airstream to force contaminants entrained in the airstream through and out of the containment vessel. The method may also, or alternatively, include a valve downstream of the containment vessel to selectively prevent the airstream from forcing contaminants entrained in the airstream through and out of the containment vessel, thereby trapping the contaminants within the containment vessel.

DETAILED DESCRIPTION OF THE INVENTION

Figure 1:
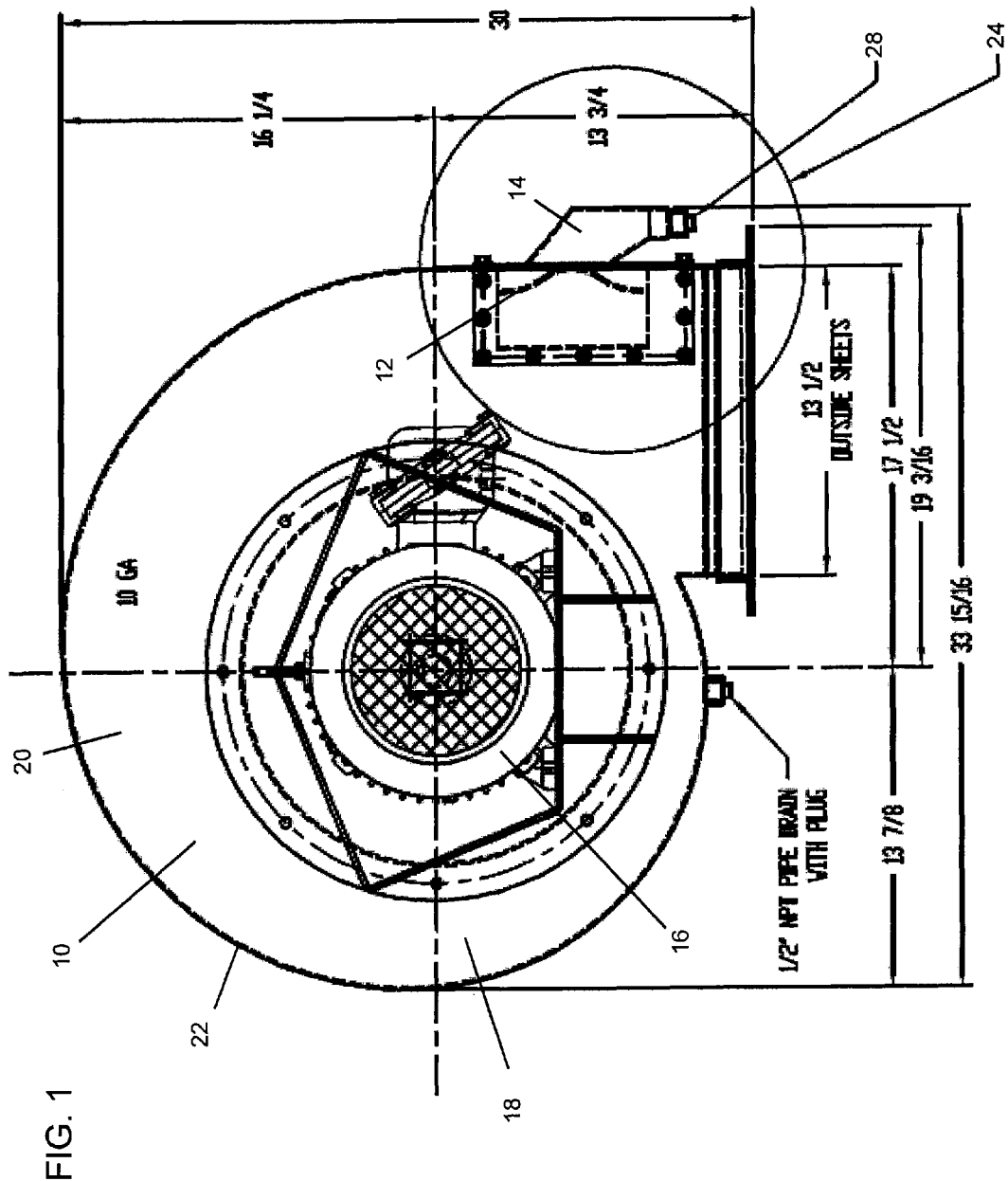
FIG. 1 illustrates a side view of a centrifugal fan assembly having a particular embodiment of a diverter and containment vessel mounted thereto utilizing certain aspects of the present inventions.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created a system for separating contaminants from an airstream, the system comprising: a centrifugal fan housing; a centrifugal fan disposed within the housing and configured to provide an airstream within the housing; a contaminant containment vessel mounted to an outer surface of the housing; and a diverter in the airstream downstream of the fan and within the housing, the diverter being configured to separate a portion of the airstream from a remainder of the airstream, accelerate the portion of the airstream towards the containment vessel, and thereafter guide the portion of the airstream towards the remainder of the airstream. The diverter may be configured so as to prevent any negative impact the rated performance of the fan and housing combination, such that a performance of the system is not measurably different than the rated performance of the fan and housing combination. The diverter may accelerate contaminants entrained in the airstream toward the containment vessel, thereby separating the contaminants from the airstream. The containment vessel and diverter may be integrated as a removable housing adapter bolted to the housing. Alternatively, the housing adapter may be welded to the housing. The system may further include a valve downstream of the diverter and containment vessel to selectively allow the airstream to force, and selectively prevent the airstream from forcing, contaminants entrained in the airstream through and out of the containment vessel. The diverter may create a low pressure area within the containment vessel. More specifically, the diverter may accelerate and reduce a pressure of the portion of the airstream compared to the remainder of the airstream. For example, the diverter may be a complex curved airfoil and/or a plate mounted within and across the housing that is configured to first divert the portion of the airstream out of the housing and then guide the portion of the airstream back into the housing.

FIG. 1 is an illustration of a centrifugal fan assembly 10 having a particular embodiment of a diverter 12 and containment vessel 14 mounted thereto utilizing certain aspects of the present inventions. More specifically, the centrifugal fan assembly 10 preferably includes a motor driven centrifugal fan 16 mounted within a centrifugal fan housing 18. The fan 16 and housing 18 are preferably standardized centrifugal fan assemblies readily and commercially available, such as those from Industrial Air Products, Inc. In one particular embodiment, the fan 16 and housing 18 may be size 165-58% (16.5 inch diameter with 58% wheel width), Type B, from Industrial Air Products, Inc. For example, in one embodiment, the centrifugal fan assembly 10 provides a rated performance of three thousand cubic feet per minute airstream, at eleven inches of water gauge static pressure, at a nominal 3,600 revolutions per minute, at 9.2 brake horse power, at 0.075 density, at seventy degrees Fahrenheit, with a maximum design temperature of one hundred twenty degrees Fahrenheit. Of course, this is just one specific example of one embodiment of the present invention. Other readily available standardized centrifugal fan assemblies may be used.

In one particular preferred embodiment, the housing 18 may be constructed from ten gauge steel sides 20 and/or twelve gauge steel outer wall 22. In this particular preferred embodiment, exterior surfaces of the sides 20 may be approximately eleven and a half inches apart.

The diverter 12 preferably spans between the sides 20 near the outer wall 22, in the airstream downstream of the fan 16 and within the housing 18. This allows the diverter 12 to separate a portion of the airstream closest to the outer wall 22 from a remainder of the airstream. It can be appreciated the by action of the centrifugal fan 16, the majority of contaminants travel through the housing 18 along the outer wall 22. Thus, the present invention only disturbs that portion of the airstream that is most likely to contain, and/or be most heavily burdened with, the contaminants, such as water and/or dust or other particulate matter.

The diverter 12 preferably accelerates the portion of the airstream towards the containment vessel 14, and thereafter guides the portion of the airstream towards the remainder of the airstream. In this manner, none of the airstream is lost. Rather, the portion of the airstream is merely diverted. Thus, the diverter does not negatively impact the rated performance of the fan assembly 10. In other words, the system performance is not measurably different than the rated performance of the fan assembly 10. As a result, the system performance, with the diverter 12 in the airstream downstream of the fan 16 and within the housing 18, would remain three thousand cubic feet per minute airstream, at eleven inches of water gauge static pressure, at a nominal 3,600 revolutions per minute, at 9.2 brake horse power, at 0.075 density, at seventy degrees Fahrenheit, with a maximum design temperature of one hundred twenty degrees Fahrenheit.

In a preferred embodiment, the diverter 12 is a complex curved airfoil that creates a low pressure area within the containment vessel. The diverter 12 may be a complex curved plate, shaped like an airfoil, or may be a complete airfoil, with inner and outer sides, surfaces, and/or skins. More specifically, in one embodiment, the diverter 12 is a complex curved plate made of twelve gauge steel.

In any case, the diverter 12 accelerates the portion of the airstream towards the containment vessel. In doing so, the diverter 12 may reduce the static pressure of that portion of the airstream compared to the remainder of the airstream. Because the diverter 12 accelerates the portion of the airstream towards the containment vessel, the diverter also accelerate contaminants entrained in the airstream toward the containment vessel 14. As the portion of the airstream is guided back towards the remainder of the airstream, the contaminants tend to continue towards the containment vessel 14 due to their greater mass. In this manner, the diverter 12 separates the contaminants from the airstream.

The system of the present invention may including a valve 28 downstream of the diverter 12 and containment vessel 14. The valve 28 may selectively allow the airstream to force, and/or selectively prevent the airstream from forcing, contaminants entrained in the airstream through and out of the containment vessel 14. For example, the valve 28 may normally be kept closed, thereby forcing all of the portion of the airstream that is guided towards the containment vessel to rejoin the remainder of the airstream. In this manner, no loss of performance is measureable, with or without the diverter 12 in place within the housing 18. Then, as needed, or periodically, the valve 28 may be opened thereby allowing portion of the airstream to force the contaminants out of the containment vessel 14. If the valve is closed before all of the contaminants are forced out of the containment vessel 14, little or none of the airstream should escape, thereby incurring no measurable loss of performance.

In any case, one contributing factor to the present invention's ability to obtain contaminant separation with no measurable loss of performance is that the housing 18 maintains its integrity, i.e. stays intact. The containment vessel 14 is secured over, thereby sealing, the hole cut into the housing to accommodate the diverter 12. Thus, there is no bleed off of the airstream, and therefore no measurable loss of performance. Another benefit of the present invention is that at least partially because there is no bleed off of the airstream there is no noise leak. In this manner, the present invention does not increase the noise emitted from the standardized centrifugal fan assembly 10.

Alternatively, the valve 28 may be left open thereby allowing the portion of the airstream to substantially continually force the contaminants out of the containment vessel 14. However, this would likely incur some loss of performance. A pressure and/or flow control device may be used to control flow of the contaminants out of the containment vessel 14, thereby preventing the portion of the airstream from passing through the valve 28, thereby incurring no measurable loss of performance. For example, a device, such as a steam trap, may be used to allow the contaminants to exit the valve 28, or another port in the containment vessel 14, while preventing the airstream from doing so, thereby automatically draining the containment vessel 14 while incurring no measurable loss of performance. In alternative embodiments, the valve 28 may be replaced with a removable plug and/or a pipe nipple with removable cap.

In some embodiments, the diverter 12 itself may extend outside of the housing 18 and/or may be configured to divert the portion of the airstream out of the housing and then guide the portion of the airstream back into the housing. For example, on one embodiment, a middle portion of the diverter 12 may extend beyond the housing 18 by approximately one eighth inch. Alternatively, the diverter 12 and/or the portion of the airstream, or some lesser part thereof, may not exit the housing at all, but merely be accelerated toward the containment vessel 14.

Figure 2:
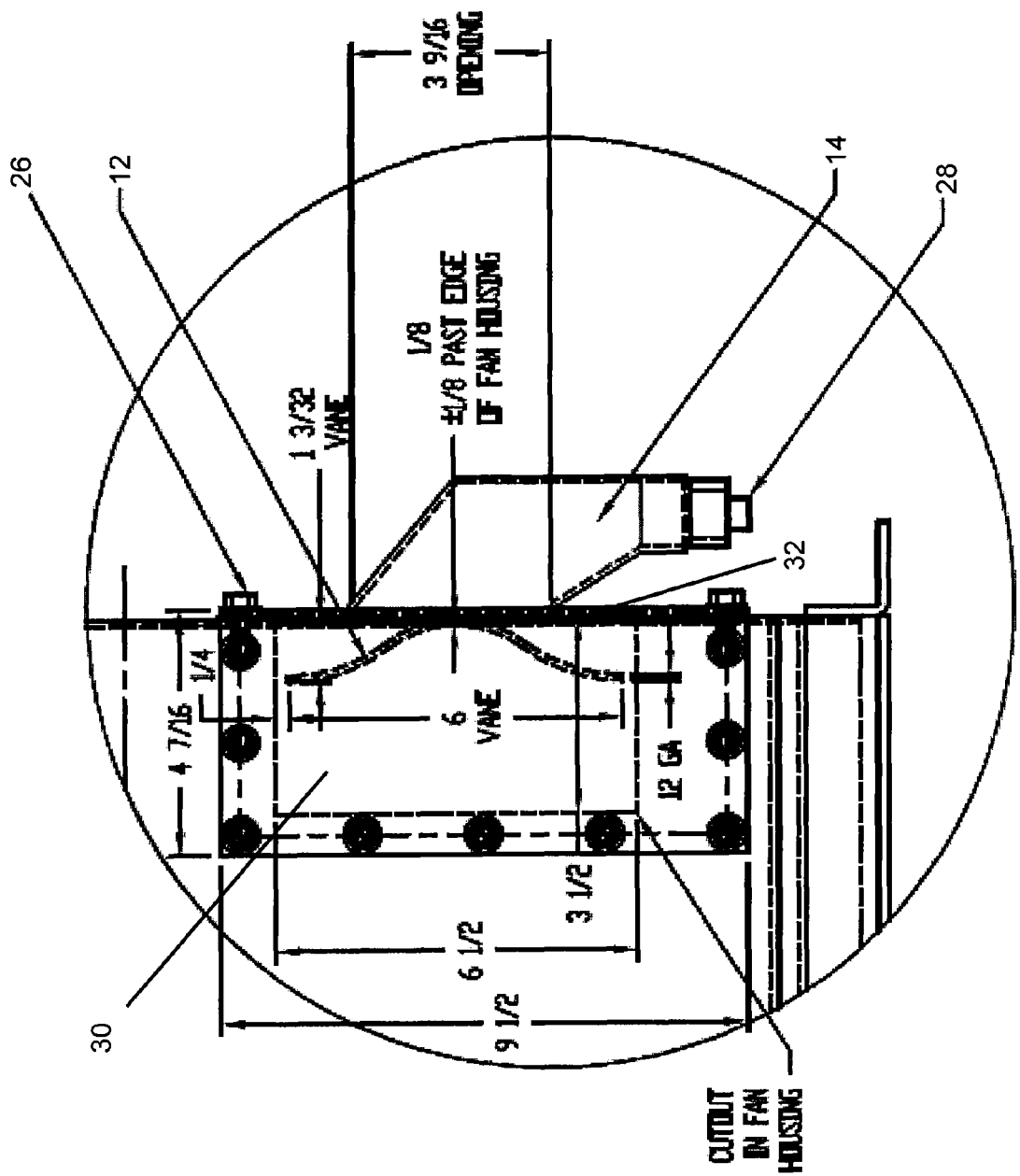
FIG. 2 illustrates a close up view of a particular embodiment of the diverter and containment vessel utilizing certain aspects of the present inventions.

In preferred embodiments, as best shown in FIG. 2, the diverter 12 and the containment vessel 14 are configured as a housing adapter 24. The housing adapter 24 is preferably removable and therefore bolted to the housing 18 with a plurality of bolts 26. Alternatively, the housing adapter 24 may be welded to the housing 18.

In any case, the housing adapter 24 may include two parallel flanges 30 configured to be secured outside of the fan housing 18 and an outer flange 32 connecting the two parallel flanges 30. The contaminant vessel 14 is preferably mounted outside of the outer flange 32. The diverter 12 preferably spans the parallel flanges 30.

The housing adapter 24 may be installed onto virtually any readily and commercially available standardized centrifugal fan assembly 10. First, one needs to cut a hole in the housing 18, spanning the outer wall 22 and through both sides 20. Then, the housing adapter 24 may be mounted the housing 18 by sliding the diverter 12 into position within the hole. It can be appreciated that the hole needs to be as big as the diverter 12, but may be bigger. In one specific embodiment, where the diverter 12 is approximately six inches tall, the hole may be six and a half inches tall, spanning from side 20 to side 20 of the housing 18.

The housing adapter 24 may include an opening between the diverter 12 and the containment vessel 14, as needed, to control the flow of the airstream and/or contaminants into the containment vessel 14. In one specific embodiment, the opening may be three and nine sixteenths inches tall, spanning from side 20 to side 20 of the housing 18.

The housing adapter 24 may also include a sight glass to determine a level of contaminants in the containment vessel 14. This sight glass may be useful in determining when, how frequently, and/or how long to open the valve 28 to drain the contaminants in the containment vessel 14, while incurring no measurable loss of performance. The sight glass may be a traditional externally mounted sight glass, such as those typically found on pressure vessels commonly holding liquids and/or gases. Alternatively, because the contaminants may include particulate matter and the static pressure within the containment vessel 14 is not expected to be too great, the sight glass may be a clear or opaque window in one or both of the two parallel flanges 30 and/or sides of the containment vessel 14. For example, one or both of the sides of the containment vessel 14 may include a substantially vertical cut-out, with a clear acrylic cover bolted or otherwise mounted to cover the cut-out. In preferred embodiments, the cover is mounted within the containment vessel 14 such that any pressure within the containment vessel 14 simply pushes the cover against the containment vessel 14, thereby enhancing a seal between the cover and the containment vessel 14.

In a preferred embodiment, the diverter 12 is fixed within the housing adapter 24 and/or housing 18. However, in alternative embodiments, the may be an adjustable assembly that allows field adjustment of the diverter 12 within the fan housing 18. This would allow for optimum field adjustments on multiple fan assemblies with different airflows. The adjustment of the diverter 12 assembly could be made using spacers, such as or gaskets, between the fan housing 18 and the housing adapter 24. For example, the diverter 12 could be set back one half inch greater than expected into the fan housing 18 without spacers. But, with one or more spacers added, the diverter 12 could be brought to one eighth inch beyond the fan housing 18, as discussed above, or more.

Additionally, or alternatively, an angle of the diverter 12 may be adjustable. For example, in a preferred embodiment, both ends of the diverter 12 are approximately one inch within the outer wall 22 of the housing 18, thereby slicing off an outer one inch of the airstream. However, an upper end of the diverter 12 may be further within the housing 18 that a lower end of the diverter 12. This configuration may scoop more of the airstream, or the diverter 12 may be set further out, thereby still slicing off about an inch or less of the airstream. It will be appreciated that changing the angle of the diverter 12, such that the ends of the diverter 12 are not equidistant from the outer wall 22 of the housing 18 would likely change the cross sectional area that the portion of the airstream passes through upon exiting and then reentering the housing 18. Upon reading this disclosure, one with ordinary skill in the art would understand that the cross sectional area that the portion of the airstream passes through upon reentering the housing 18 may be less than the cross sectional area that the portion of the airstream passes through upon exiting the housing 18, since contaminants entrained in the airstream upon exiting the housing 18 preferably do not reenter the housing 18.

Additionally, or alternatively, the angle of the diverter 12 may be adjustable in order to control the acceleration of the portion of the airstream toward the containment vessel 14. Additionally, or alternatively, the angle of the diverter 12 may be adjustable in order to control the change in pressure of the portion of the airstream within the containment vessel 14 with respect to the remainder of the airstream within the housing 18.

Other and further embodiments utilizing one or more aspects of the inventions described above can be devised without departing from the spirit of Applicant's invention. For example, more than one diverter and/or containment vessel may be used. For example, one containment vessel may have two openings adjacent two diverters, with the diverters arranged in series with the airstream. Further, the various methods and embodiments of the present invention can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A system for separating contaminants from an airstream, the system comprising:

a centrifugal fan housing;

a centrifugal fan disposed within the housing and configured to provide an airstream within the housing, the fan being operable to provide a rated performance when disposed within the housing absent downstream restrictions;

a contaminant containment vessel mounted to an outer surface of the housing; and a diverter in the airstream downstream of the fan and within the housing, the diverter being configured to separate a portion of the airstream from a remainder of the airstream, accelerate the portion of the airstream towards the containment vessel, and thereafter guide the portion of the airstream towards the remainder of the airstream.

2. The system as set forth in claim 1, wherein the diverter is configured to not negatively impact the rated performance of the fan within the housing, such that a performance of the system is not measurably different than the rated performance of the fan within the housing.

3. The system as set forth in claim 1, wherein the diverter is further configured to accelerate contaminants entrained in the airstream toward the containment vessel, thereby separating the contaminants from the airstream.

4. The system as set forth in claim 1, wherein the containment vessel and diverter are configured as a removable housing adapter bolted to the housing.

5. The system as set forth in claim 1, wherein the containment vessel and diverter are configured as a housing adapter welded to the housing.

6. The system as set forth in claim 1, further including a valve downstream of the diverter and containment vessel, the valve configured to selectively allow the airstream to force, and selectively prevent the airstream from forcing, contaminants entrained in the airstream through and out of the containment vessel.

7. The system as set forth in claim 1, wherein the diverter is configured to create a low pressure area within the containment vessel.

8. The system as set forth in claim 1, wherein the diverter is configured to accelerate and reduce a pressure of the portion of the airstream compared to the remainder of the airstream.

9. The system as set forth in claim 1, wherein the diverter is a complex curved airfoil.

10. The system as set forth in claim 1, wherein the diverter is a plate mounted within and across the housing that is configured to first divert the portion of the airstream out of the housing and then guide the portion of the airstream back into the housing.

11. A system for separating contaminants from an airstream, the system comprising:

two parallel flanges configured to be secured outside of a centrifugal fan housing;

an outer flange connecting the two parallel flanges;

a contaminant containment vessel mounted to the outer flange; and a diverter spanning the parallel flanges, such that the diverter is configured to separate a portion of an airstream flowing between the parallel flanges from a remainder of the airstream, accelerate the portion of the airstream towards the containment vessel, and thereafter guide the portion of the airstream towards the remainder of the airstream.

12. The system as set forth in claim 11, wherein the diverter is further configured to accelerate contaminants entrained in the airstream toward the containment vessel, thereby separating the contaminants from the airstream.

13. The system as set forth in claim 11, further including a valve downstream of the diverter and containment vessel, the valve configured to selectively allow the airstream to force, and selectively prevent the airstream from forcing, contaminants entrained in the airstream through and out of the containment vessel.

14. The system as set forth in claim 11, wherein the diverter is configured to create a low pressure area within the containment vessel.

15. The system as set forth in claim 11, wherein the diverter is configured to accelerate and reduce a pressure of the portion of the airstream compared to the remainder of the airstream.

16. The system as set forth in claim 11, wherein the diverter is a complex curved airfoil.

17. A method of separating contaminants from an air stream, the method comprising the steps of:

providing a standardized centrifugal fan housing, the housing having two sides and an outer wall connecting the sides;

providing a centrifugal fan disposed within the housing such that the fan is operable to provide an airstream at a rated performance when disposed within the housing absent downstream restrictions;

cutting a hole in the housing, the hole spanning the outer wall and through both sides;

mounting a housing adapter to the housing, the adapter including—a contaminant containment vessel exterior to the housing; and a diverter spanning the sides, such that the diverter is configured to separate a portion of the airstream flowing between the sides from a remainder of the airstream, accelerate the portion of the airstream towards the containment vessel, and thereafter guide the portion of the airstream towards the remainder of the airstream.

18. The method as set forth in claim 17, wherein mounting the diverter does not negatively impact the rated performance of the fan within the housing, such that a performance of the airstream downstream of the diverter is not measurably different than the rated performance of the fan within the housing.

19. The method as set forth in claim 17, further including the step of opening a valve downstream of the containment vessel to selectively allow the airstream to force contaminants entrained in the airstream through and out of the containment vessel.

20. The method as set forth in claim 17, further including the step of closing a valve downstream of the containment vessel to selectively prevent the airstream from forcing contaminants entrained in the airstream through and out of the containment vessel, thereby trapping the contaminants within the containment vessel.

* * * * *